Nov. 26, 1968 A. C. VOGEL 3,412,494

WORLD TIME GUIDE DEVICE

Filed Aug. 22, 1966 2 Sheets-Sheet 1

INVENTOR
ARTHUR C. VOGEL
BY
Nicholas J. Garofalo
ATTORNEY

INVENTOR
ARTHUR C. VOGEL
BY Nicholas J. Garofalo
ATTORNEY

United States Patent Office 3,412,494

Patented Nov. 26, 1968

3,412,494

WORLD TIME GUIDE DEVICE

Arthur C. Vogel, 7 Bittersweet Lane, Glen Cove, N.Y. 11542

Filed Aug. 22, 1966, Ser. No. 574,175
7 Claims. (Cl. 40—70)

ABSTRACT OF THE DISCLOSURE

A guide including a main disc marked off into geographical time zone sectors, and including a selector dial marked off into hour sectors each showing a different hour of the day. The days of the week are shown on both the disc and the dial. The dial is pivoted centrally to the disc and interleaved with the latter, so that when the dial is rotated relative to the disc and a selected hour sector is brought into register with a selected zone sector the corresponding hour for any day will be indicated for each of the other zone sectors.

This invention is concerned with a device whereby any selected hour of a particular day in a selected geographical location may be compared as to the corresponding hour and day in any other selected geographical location throughout the world.

It includes a selector dial having printed upon its face the days of the week and the twenty-four hours of the day. This dial is interleaved with a time zone disc and has rotation relative to the latter. The zone disc has printed upon its face the days of the week and is marked off into twenty-four time zones each having a time differential of one hour from the next. Each time zone has printed thereon one or more of the principal countries or cities located therein. The arrangement is such that each sequential predetermined hour increment of rotation of the selector dial relative to the zone disc informs the reader as to the hour and day in any selected time zone relative to a selected hour and day of another selected time zone.

A further feature of the invention is an interleaved relation and stop means whereby the selector dial may be rotated in interleaved relation to the zone disc for substantially 360 degrees in either direction, being limited in its rotation by the stop means upon completion of substantially 360 degrees of rotation in a selected direction.

Figure 1:
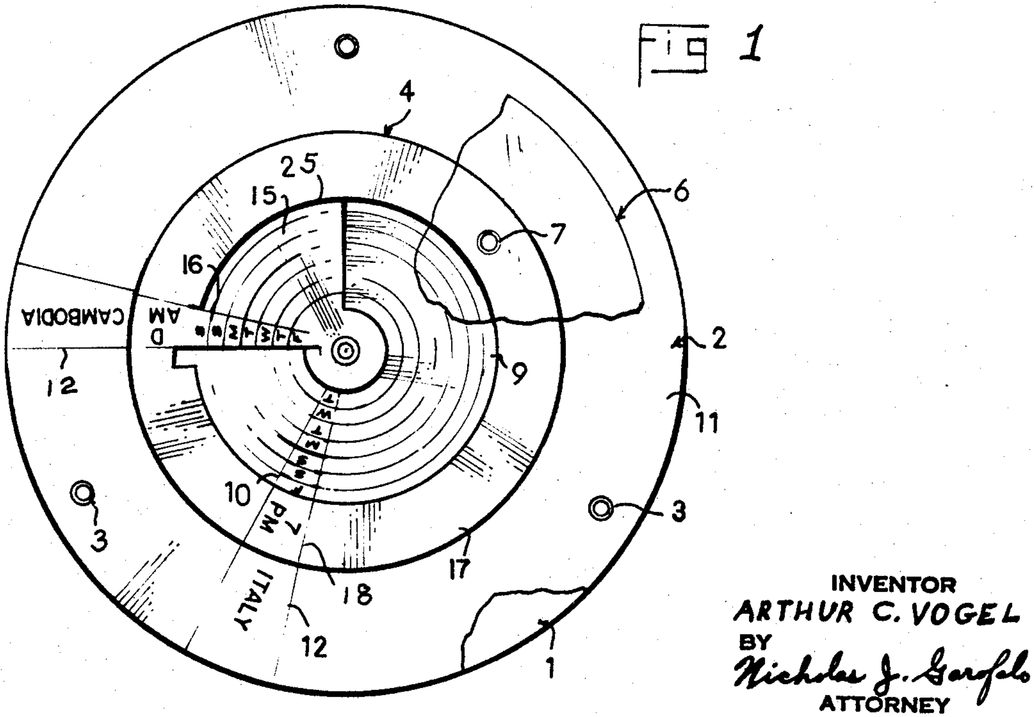
FIG. 1 is a plan view of a world time guide device embodying the invention, portions being broken away for clarity of illustration.

The assembled device illustrated in FIG. 1 comprises a backing or base disc 1 upon which a main or time zone disc 2 is superimposed and is anchored by means of grommets 3. Superimposed upon and interleaved with the zone disc is a selector dial or disc 4. The latter is axially pivoted by means of a grommet 5 to the base disc for rotation relative to the zone disc. The several discs and selector dial are formed of thin firm material such as cardboard. A disc 6 of firm transparent plastic material is anchored by means of a grommet 7 and the pivot 5 to the face of the selector dial. It serves as a means for rotating the selector dial relative to the zone disc.

The zone disc 2 (FIGS. 1 and 4) has an enlarged central opening 8. The face of the disc surrounding this opening is marked off into an inner ring area 9, only two sector portions 10 of which are shown for ease of illustration; and it is further marked off into an outer ring area 11 of which only two sector portions 12 are shown. The inner ring area 9 is marked off into twenty-four equal sectors 10, one adjacent the other, each of which is in turn marked off into seven arc sections 13. Each arc section is identified by a different day of the week. The days are indicated in the order of the days of the week, beginning with the letter F for Friday in the outermost arc section, and ending with T for Thursday in the innermost section. The outer ring area 11 is marked off into twenty-four equal sector portions 12, each registering with a separate sector of the inner ring area. Each sector portion 12 represents a different time zone of the world, having a time differential of one hour from the next adjacent zone. Each time zone has printed thereon one or more of the principal countries and cities located therein; for example, Italy is shown as being located in one time zone, and Cambodia as being located in another. Other geographical locations in other sector portions 12, as earlier mentioned, are not shown so as to facilitate and obtain clarity of illustration. a radial slot 14 extends from the central opening 8 partway into the outer ring area 11. The function of the slot is to enable an interleaved relation and rotation of the selector dial 4 relative to the zone disc 2, as will be shortly described herein.

Figures 3, 4, 5:
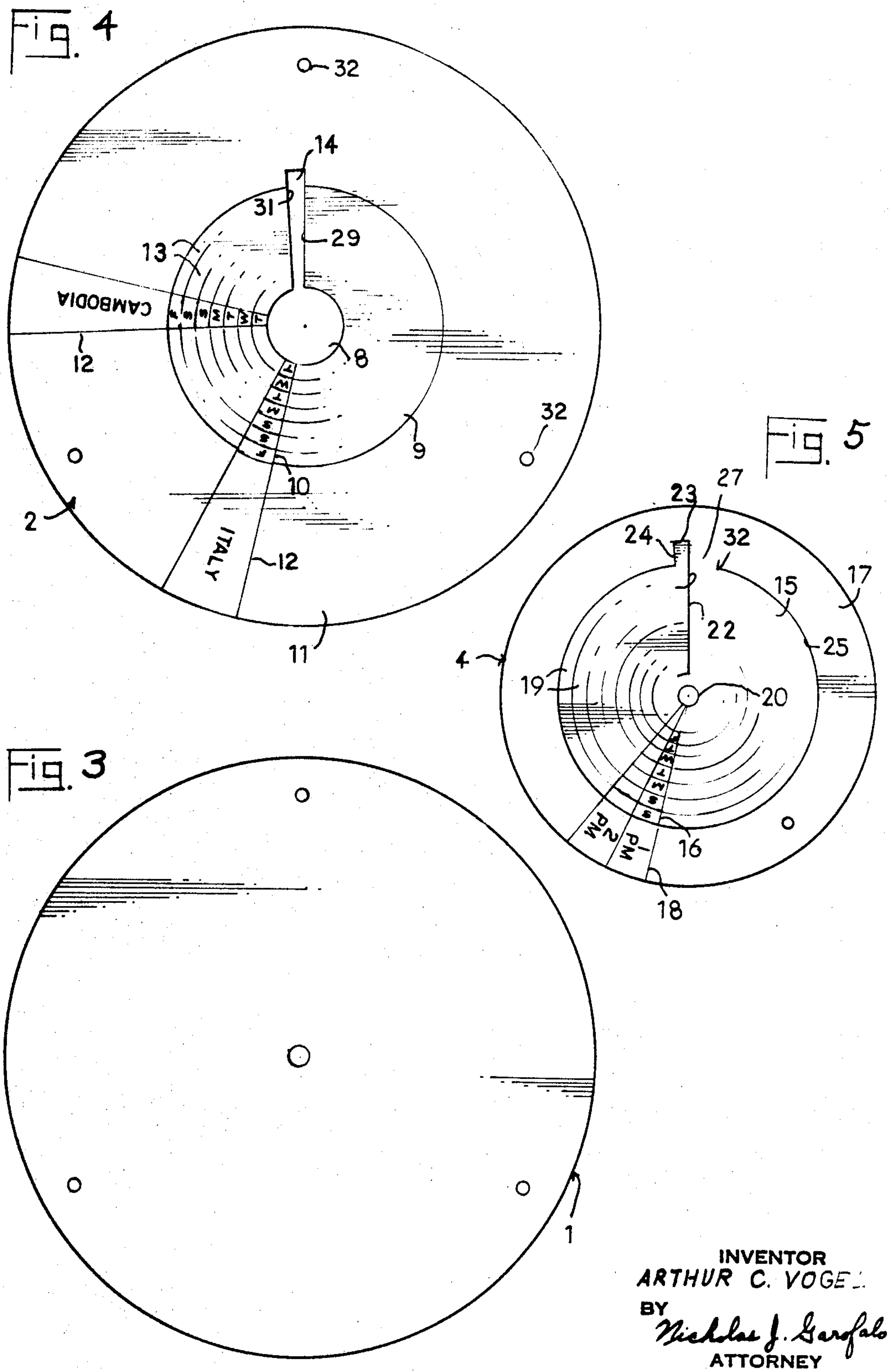
FIG. 3 is a plan view of the base disc component.
FIG. 4 is a plan view of the time zone disc component.
FIG. 5 is a plan view of the selector dial component.

The selector dial component 4 (FIGS. 1 and 5) is of relatively smaller diameter than the zone disc. It is marked off into an inner ring area 15, only two of the sector portions 16 of which are shown in FIG. 5 for ease and clarity of illustration; and it is further marked off into an outer ring area 17, of which only two sector portions 18 are shown in FIG. 5. The inner ring area 15 is marked off into twenty-four sectors 16 and arc sections 19 which are identical to the sectors 10 and arc sections 13 of the zone disc, each arc section 19 being identified by a different day of the week. The days are also indicated in the arc sections 19 in the order of the days of the week, but begin with the letter S for Saturday in the outermost arc section and end with the letter F for Friday in the innermost section. The small hole 20 centrally of the selector dial serves to receive the pivot 5. The outer ring area 17 is marked off into twenty-four equal sector portions, 18, each registering with a sector 16 of the inner ring area. Each sector portion 18 is identified in clockwise order by a different hour of the day; for example, the hour 7 p.m. is indicated in one sector portion, and the 0 a.m. hour is indicated in another. The remaining hour numerals are not indicated for ease of illustration.

Figure 2:
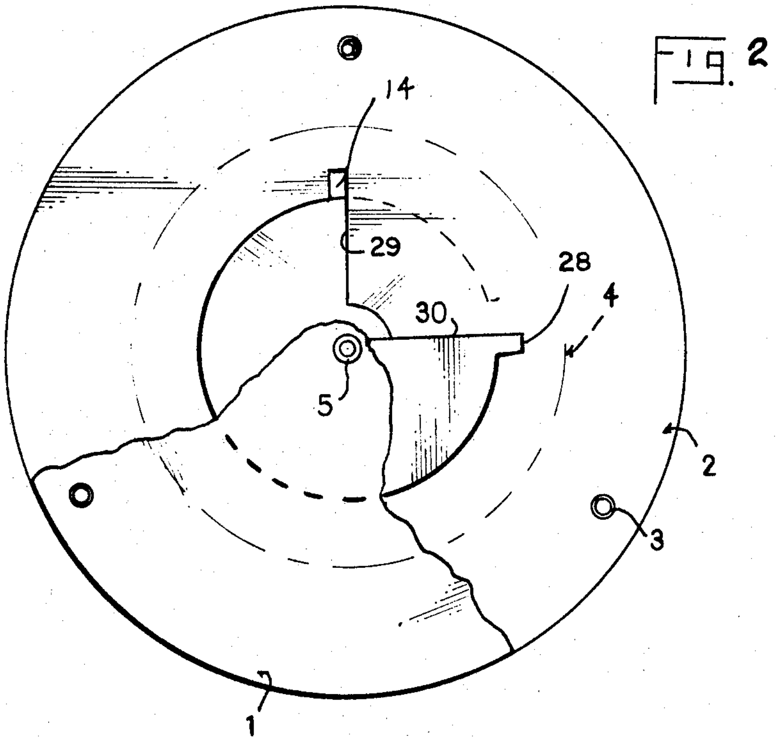
FIG. 2 is a rear plan view, portions being broken away, showing the interleaved relation of the selector dial and zone disc.

To enable interleaved rotation of the selector dial 4 relative to the zone disc 2, the selector dial is provided with a radially extending through cut 22. This cut extends for the full radius distance of the inner ring area 15 and partway into the outer ring area 17. Cut 22 then continues counterclockwise as at 23 for a few degrees; then it extends radially inward a short distance at 24 to connect with an arcuate through cut 25. Cut 25 is along a circular line dividing the inner ring area 15 off from the outer ring area 17, and extends to a point 26 short of meeting with the radial cut 22. It is apparent that because of the several cuts the inner ring area 15 is integrally supported to the outer ring area 17 only by the narrow body portion 27 between the point 26 and the radial cut 22. The radial cut 22 defines a leading edge 30 enabling insertion of the inner ring area 15 of the selector dial through the slot 14 of the zone disc 2 to obtain an interleaved relation of the one to the other. A lug or ear 28 defined by cuts 22, 23, and 24 serves as a stop which cooperates with one radial edge 29 of slot 14 of the zone disc to limit the extent of rotation in a counterclockwise direction of the selector dial relative to the zone disc; and the point 26 is cooperable with the opposite edge 31 of the slot to limit the extent of relative rotation of the selector dial in a clockwise direction. The selector dial has substantially 360 degrees of rotation in either direction relative to the zone disc. This interleaved relation is best illustrated in FIGS. 1 and 2.

To assemble the several separate components of the device together, the zone disc 2 is first anchored at opportune points 32 in its marginal area with the base disc 1 by means of grommets 3. Next, the leading edge 30 and the lug 28 of the inner area of the selector dial are inserted through the slot 14 in interleaved relation between the zone disc 2 and the base disc 1. The transparent plastic disc 6 is riveted by means of the grommet 7 to the outer ring area 17 of the selector dial. The selector dial and plastic disc are then pivoted as a unit to the base disc 1 by means of the grommet 5.

It is to be noted that when the several components are thus assembled, the arc sections 19 of the inner ring area of the selector dial register with correspondingly located arc sections 13 of the zone disc as the selector dial is rotated relative to the latter, so that the arc sections 19 designated by the letters S, S, M, T, W, T, F, of the selector dial respectively register in radial order with the arc sections 13 designated by the leters F, S, S, M, T, W, T, of the zone disc.

In explaining the use of the device, let it be assumed that a traveler is located at 7 p.m. on a Friday in the time zone in which Italy is located, and he wishes to know what the corresponding hour and day would be in some other geographical location of the world, for example, Cambodia. To ascertain this, the traveler rotates the selector dial either clockwise or counter-clockwise, as required, relative to the zone disc 2 until the sector portion marked 7 p.m. on the selector dial registers with the zone disc sector portion showing Italy on the zone disc. He then checks the zone disc sector portion showing Cambodia to see what hour designated sector portion of the selector dial is then registered with Cambodia. This he will find to be 0 a.m. Since it then happens to be Friday in Italy, the traveler will, upon checking the corresponding arc of the sector registered with Cambodia, find that it is the next day, or Saturday in Cambodia. Accordingly, if it is 7 p.m. and Friday in Italy, it will be 0 a.m. and Saturday in Cambodia. The day and hour of other geographical locations, not shown, printed in the various other sector portions, not shown, may be similarly compared.

I claim:

1. A device of the character described comprising a base disc, a main disc overlying the base disc provided with a central opening and having marked about its surface certain data, means fixing the main disc to the base disc at a plurality of selected points, a selector dial of smaller diameter than the main disc superimposed upon the surface of the latter in concentric relation, pivot means axially of the selector dial extending freely through the central opening of the main disc and pivoted to the base disc allowing rotation of the selector dial relative to the main disc, the selector dial having certain indicia marked upon its surface selectively registrable with selectable portions of the data of the main disc accordingly as the selector dial is rotated; wherein the main disc has a slot therein extending radially from the central opening, the selector dial has an arcuate cut through its surface extending in concentric relation to the pivot axis for a distance short of 360 degrees, the selector dial further having a cut through its surface extending radially from a point in close proximity to its pivot axis to a point slightly beyond the arcuate cut, the radially extending cut defining a leading edge portion of the selector dial insertable through the slot of the main disc and movable after insertion relative to the underside of the main disc accordingly as the selector dial is rotated.

2. A device as in claim 1, wherein a lug is defined at the outermost end of the leading edge portion which has cooperation with one radial edge of the slot of the main disc after the selector dial is rotated a predetermined extent in a selected direction relative to the main disc, so as to stop further rotation of the selector dial in said direction.

3. A device as in claim 1, wherein a small body portion of the selector dial spaces one end of the arcuate cut from the radially extending cut.

4. A device as in claim 3, wherein the small body portion adjacent the end of the arcuate cut is cooperable with an opposite radial edge of the slot of the main disc after the selector dial has been rotated for a predetermined degree in the opposite direction so as to stop further rotation thereof in said direction.

5. A device as in claim 4, wherein the main disc is marked off into twenty-four equal sector portions, each defining a time zone having a time differential of one hour from the next, and the certain data marked upon the main disc comprises one or more geographical regions located in in each of said time zones.

6. A device as in claim 5, wherein the area of the selector dial between its arcuate cut and its periphery is marked off into twenty-four equal hour sector portions, each having marked in clockwise order a separate hour of the day defining the said indicia of the selector dial.

7. A device as in claim 6, wherein the selector dial has a surface ring area concentric with its pivot axis and inwardly of the arcuate cut marked off into twenty-four sectors each registering with a separate hour sector portion and marked off into seven arc sections designated in the order of the days of the week; and the main disc has a corresponding surface ring area marked off into twenty-four sectors each registering with a separate time zone sector portion and each marked off into seven arc sections designated in the order of the days of the week, the outermost arc section of the main disc being designated by a day of the week next in order to the day of the week designating the outermost arc section of the selector dial, and the several arc sections of the selector dial being registrable with the several arc sections of the main disc as the selector dial is rotated relative to the main disc.

References Cited

UNITED STATES PATENTS

| | | | |
|---|---|---|---|
| 776,297 | 11/1904 | Cordeiro | 35—44 |
| 1,223,128 | 4/1917 | Wallace | 35—44 |
| 1,539,868 | 6/1925 | Roberts | 40—70 |
| 1,607,560 | 11/1926 | Pennino | 235—88 |
| 1,836,643 | 12/1931 | Chesham | 35—74 |
| 2,039,921 | 5/1936 | Murphy | 235—88 |

EUGENE R. CAPOZIO, *Primary Examiner.*

W. H. GRIEB, *Assistant Examiner.*